FREDERIC GUTZKOW, OF SAN FRANCISCO, CALIFORNIA.

Letters Patent No. 85,005, dated December 15, 1868.

IMPROVEMENT IN THE PREPARATION OF SULPHATES, AND THE MANUFACTURE OF FINE SILVER THEREFROM.

The Schedule referred to in these Letters Patent and making part of the same.

To all whom it may concern:

Be it known that I, FREDERIC GUTZKOW, of the city and county of San Francisco, State of California, have invented an Improved Mode of Preparing Crystals of Sulphate of Silver, for Producing Fine Silver; and I do hereby declare the following description and accompanying drawings are sufficient to enable any person skilled in the art or science to which it most nearly appertains, to make and use my said invention or improvements without further invention or experiment.

The nature of my invention consists in preparing crystals of sulphate of silver in such a state of purity as to yield, after the sulphate is reduced to the metallic state, by means of copper, or any other reducing-agent, that which, in refining gold and silver bullion, is called fine silver.

The process at present employed, in the refineries of gold and silver which use sulphuric acid for dissolving the silver, is the following:

The bullion is boiled in strong sulphuric acid till all the silver is dissolved, and the solution thus formed is poured into water, or a watery solution of sulphate of copper, when most of the sulphate of silver will fall down as a crystalline powder. It has then to be dissolved in the said watery solution, to free it from gold and from sulphate of lead, and to obtain a clear solution, out of which the silver is precipitated by copper. This is a very slow process, because the sulphate of silver is very little soluble in water, and it is very uncomfortable to the persons employed in gold and silver-refineries, on account of the vehement generation of strongly-arid water-vapors, by mixing the hot sulphuric acid with water.

In the process claimed by me I act as follows:

The bullion is boiled in strong sulphuric acid, as usual, till all the silver is dissolved, but instead of pouring the hot and saturated solution thus obtained into water, I pour it into a sulphuric acid, which in the following I will call the mother-acid, and which is contained in a cast-iron pan, or any other suitable apparatus. Such acid has to be of a specific gravity of between 50° and 66° Beaumé, is to be heated to between 200° and 400° Fahrenheit, and I take from five to twenty cubic feet of such acid for each one thousand ounces, troy, of silver, which I will refine at a time.

That acid which I consider the best adapted, has a specific gravity of 58° Beaumé, and a temperature of 250° Fahrenheit, and I use ten cubic feet for one thousand ounces, troy, in the bullion.

If the bullion which I have to refine contains more than five per cent. of lead, I prefer to take a larger volume of weaker acid, in order to facilitate the settling of the sulphate of lead.

If the volume, the specific gravity, and the temperature of the mother-acid are within the limits which I stated above, the saturated solution of sulphate of silver and the mother-acid will mix without the generation of any fumes, and without the separation of any sulphate of silver.

The solution obtained is allowed to settle, till the gold and the sulphate of lead have settled down. Then it is run off into another cast-iron or leaden pan, which I will call the precipitating-pan, where it is left to cool to as low a temperature as can conveniently be obtained, when a large proportion of crystals of sulphate of silver will separate, mixed with some of the sulphates of copper and iron. After about twelve hours' cooling, which time may be shortened by artificial means, the mother-acid is pumped back whence it came, is again heated up, and ready to receive another charge of the saturated solution of sulphate of silver, as described above.

If preferred, heat may be applied after the two solutions are mixed, instead of before. As the mother-acid will increase in volume and specific gravity by the free acid contained in the saturated solution of sulphate of silver which it receives, the surplus is, from time to time, removed, after the crystals are separated, and used for dissolving the silver bullion, and the remaining mother-acid is, in the precipitating-pan, mixed with a small quantity of water, so as to bring it again to 58° Beaumé, or to that specific gravity which I choose to employ. By this small addition of water, nearly all the sulphate of silver which the mother-acid still contained is thrown down as a crystalline powder.

The crystals of sulphate of silver are taken from the precipitating-pan and put into another vessel, when they are boiled with water and scraps or sheets of copper or brass, or they are subjected to the action of any other compound known in chemistry which will reduce them to the metallic state.

The silver thus obtained is washed, pressed, and melted in the manner generally in use among the refiners of gold and silver.

Having thus described my invention,

What I claim, and desire to secure by Letters Patent, is—

The preparation of crystals, consisting principally of sulphate of silver, by separating them from their solution, in a sulphuric acid, in the manner as described above, the volume, the specific gravity, and the temperature of such acid to be within the limits as stated in my specification, for the purpose of converting such crystals into what is called in commerce fine silver.

In testimony whereof, I have hereunto set my hand and seal.

FRED. GUTZKOW. [L. S.]

Witnesses:
  J. L. BOONE,
  GEO. H. STRONG.